Dec. 11, 1962
R. B. TRELEASE
3,067,806
APPARATUS FOR PRODUCING FLEXIBLE INSULATING
COVERINGS OF BONDED FIBEROUS MATERIAL
Filed Nov. 14, 1957
6 Sheets-Sheet 1
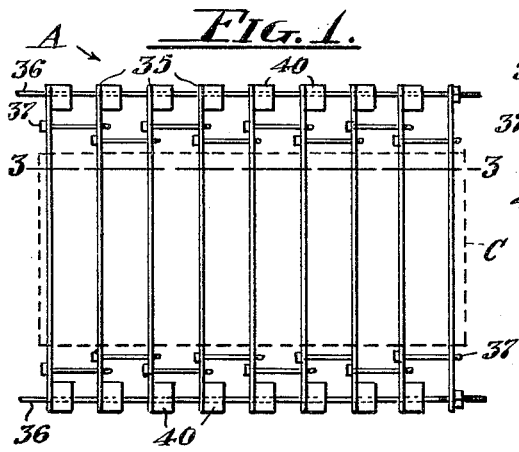
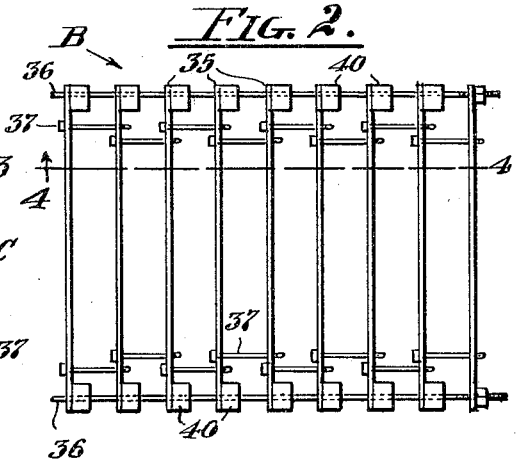
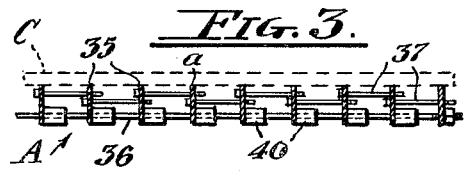
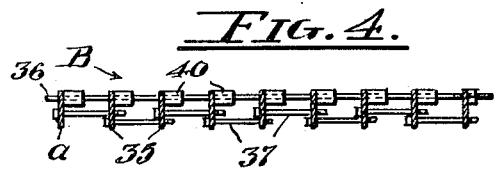
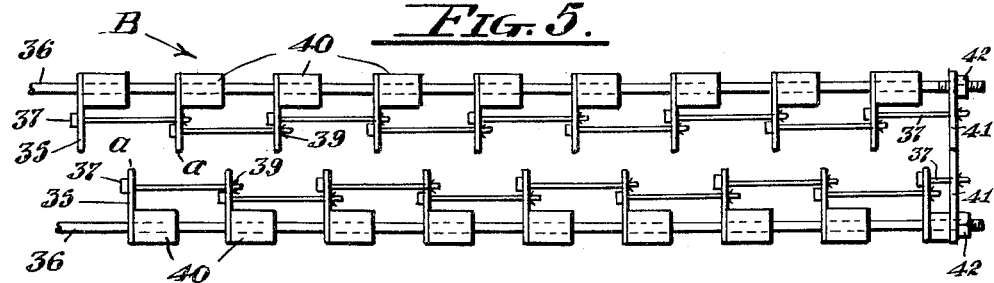
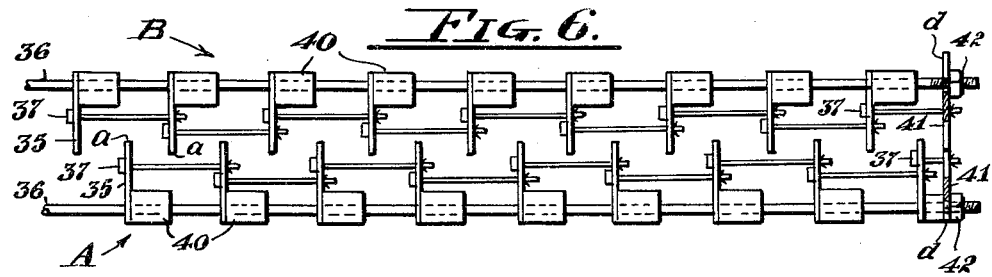
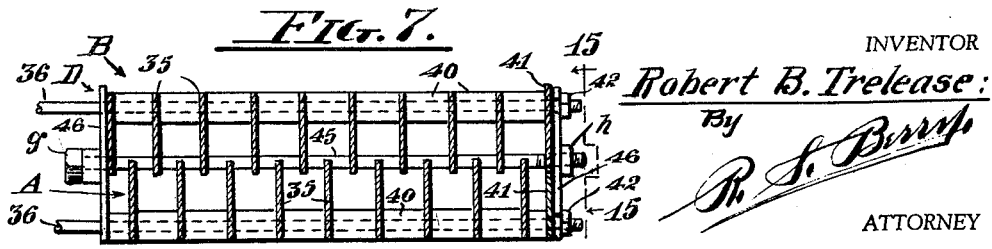
INVENTOR
*Robert B. Trelease*
By
ATTORNEY

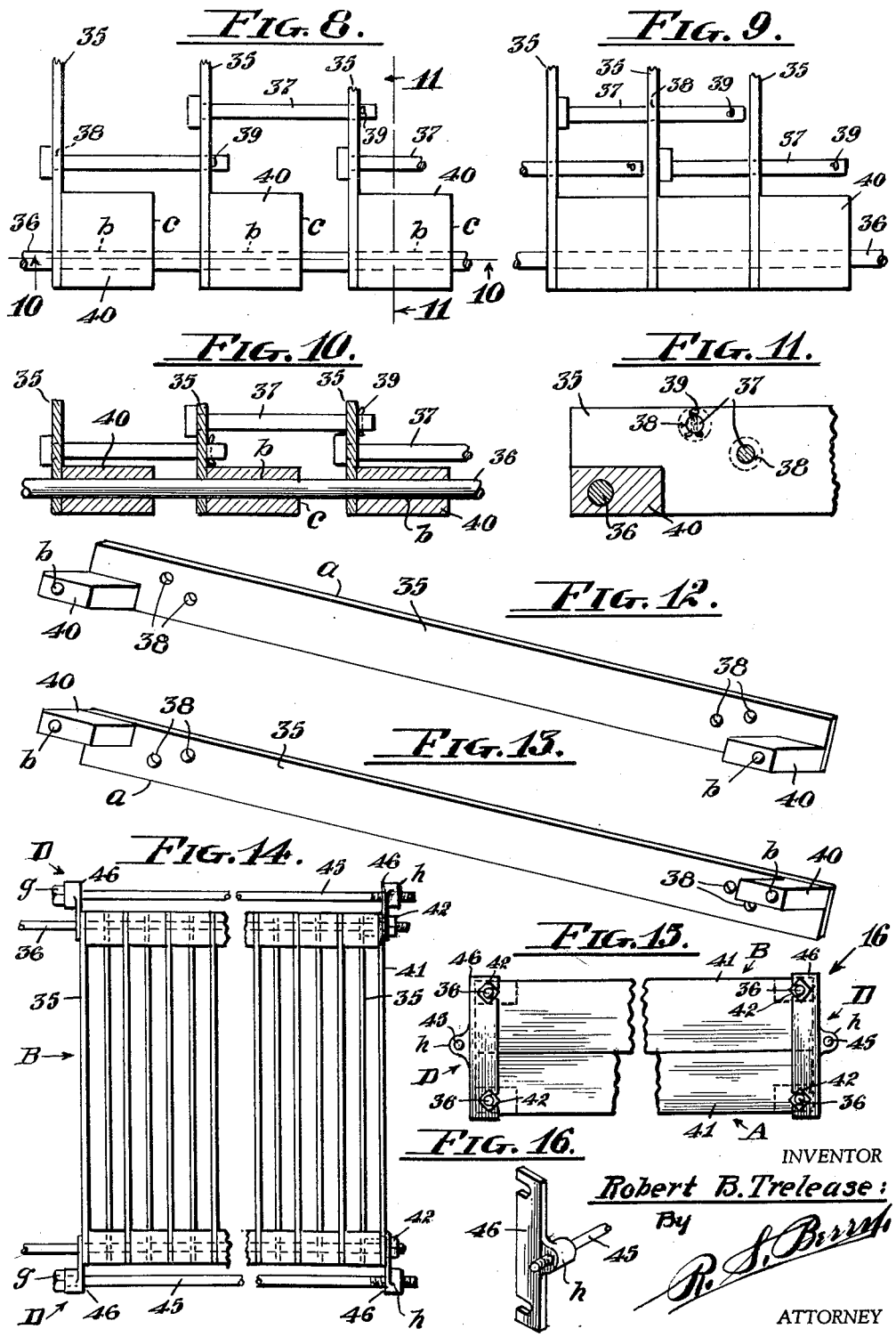

Dec. 11, 1962  R. B. TRELEASE  3,067,806
APPARATUS FOR PRODUCING FLEXIBLE INSULATING
COVERINGS OF BONDED FIBEROUS MATERIAL
Filed Nov. 14, 1957  6 Sheets-Sheet 3
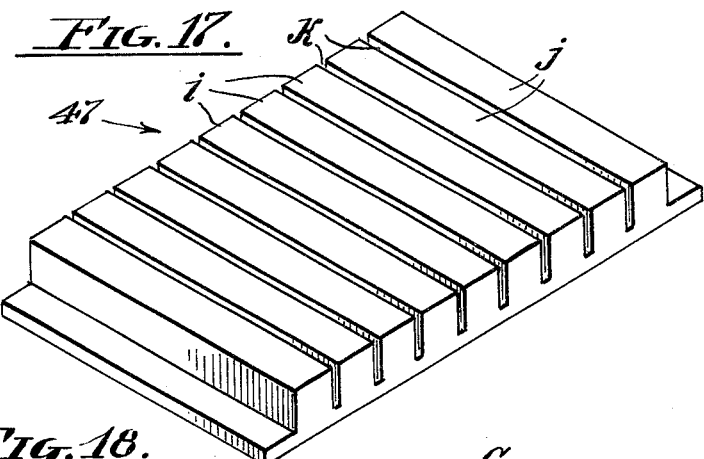
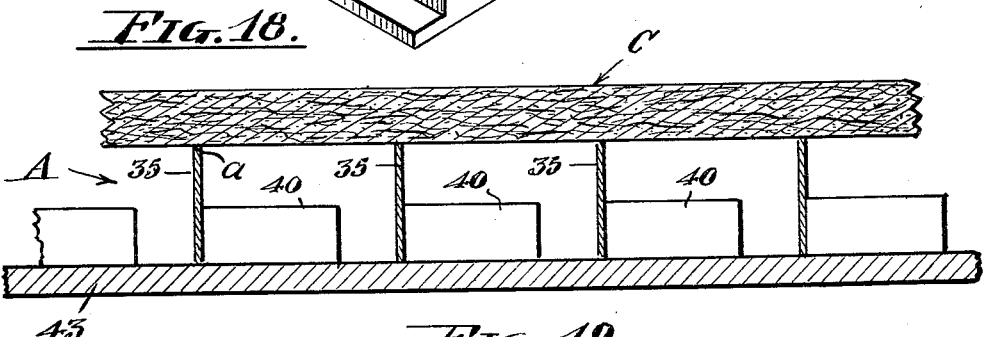
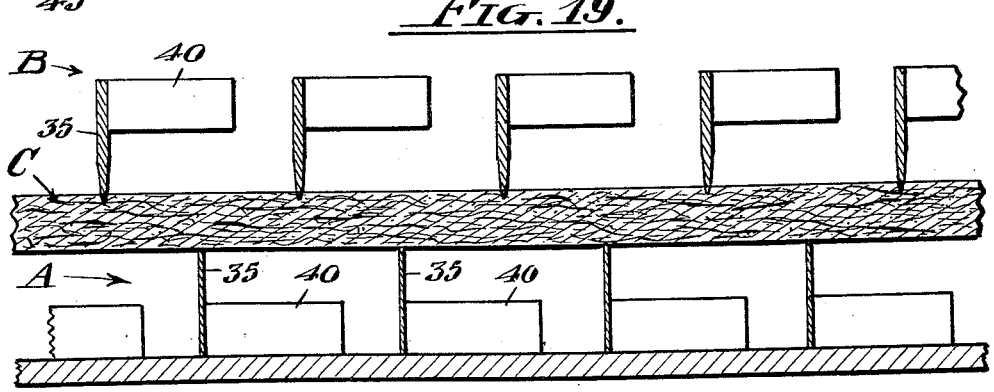
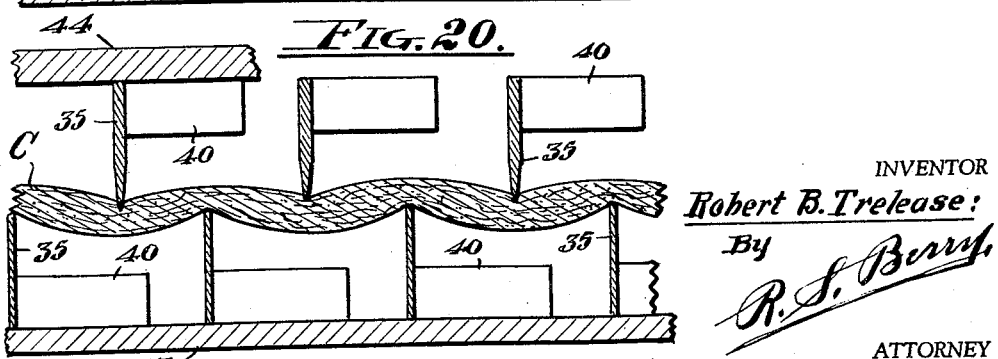
INVENTOR
*Robert B. Trelease:*
By
*R. S. Berry,*
ATTORNEY INVENTOR
Robert B. Trelease
BY
ATTORNEY INVENTOR
*Robert B. Trelease;*
BY
ATTORNEY

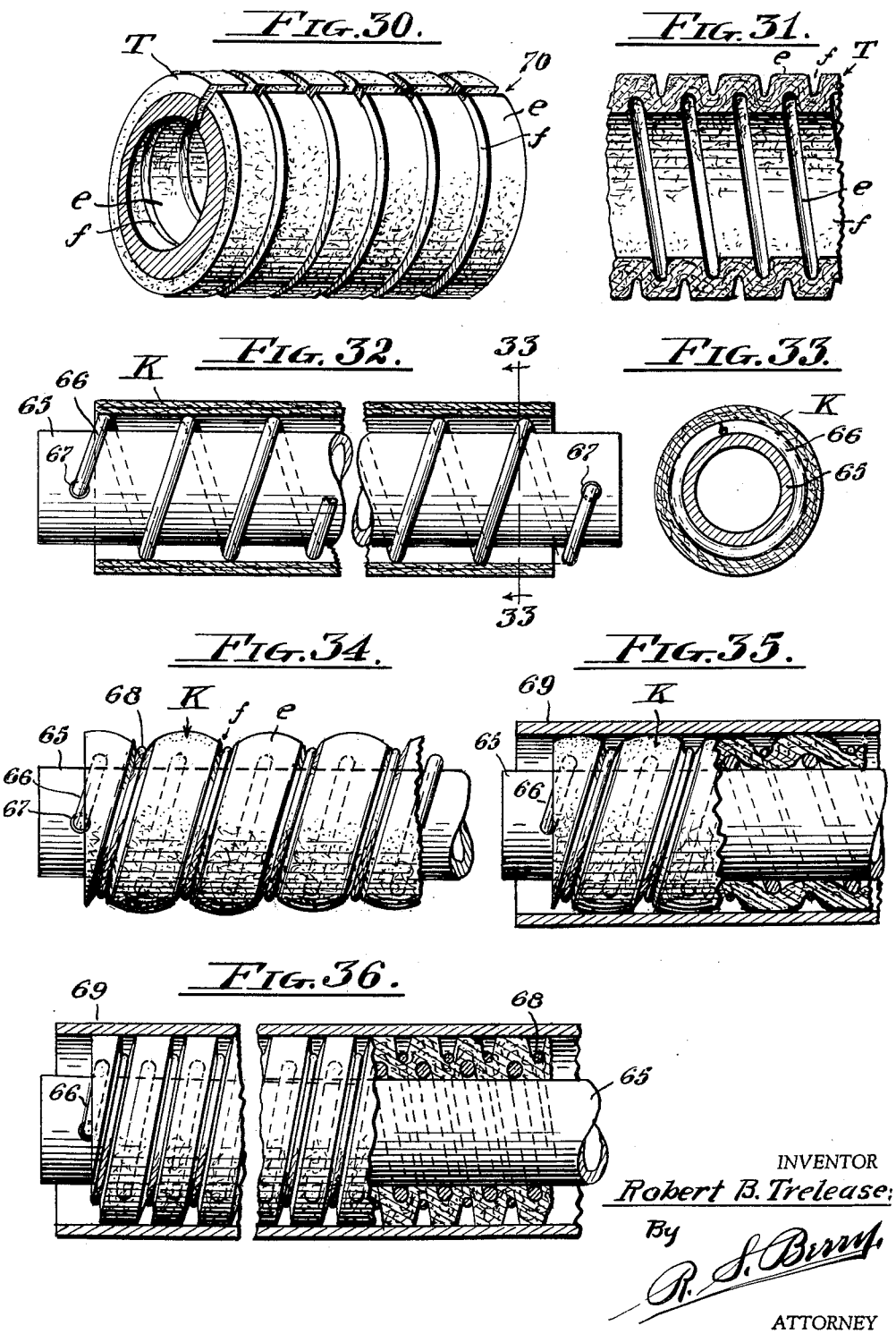

United States Patent Office 3,067,806
Patented Dec. 11, 1962

3,067,806
APPARATUS FOR PRODUCING FLEXIBLE INSULATING COVERINGS OF BONDED FIBEROUS MATERIAL
Robert B. Trelease, 11925 S. Wilton Place, Los Angeles 47, Calif.
Filed Nov. 14, 1957, Ser. No. 696,347
5 Claims. (Cl. 156—591)

This invention relates to a means and method for producing flexible insulating coverings of bonded fiberous material such as glass, asbestos and the like.

The primary object of the invention is to provide a means and method for treating preformed sheets of felted or matted material of the character described, whereby a product of substantial thickness is produced which is capable of being readily conformed to curved and angular surfaces without breakage of the material.

Another object is to provide a means and method whereby stiff sheets formed of felted or matted fibers may be impressed with spaced parallel rectilinear indentations so that the resultant product is rendered quite flexible.

Another object is to provide a temperature insulating covering of bonded glass fibers, or similar material, which covering is resilient and flexible, which possesses high density and durability, and which is capable of being easily applied and conformed to curved surfaces.

Another object is to provide a product of the above character which can be applied with a minimum of waste.

A further object is to provide a means and method for the purpose specified whereby the product may be economically produced.

With the foregoing objects in view together with such other objects and advantages as may subsequently appear, the invention resides in the construction, and in the steps and equivalents thereof, set forth by way of example in the following specification and illustrated in the accompanying drawings, in which:

FIG. 1 is a plan view of the lowermost of a pair of superimposed grilles employed in treating a sheet of felted material in producing a flat indented sheet thereof:

FIG. 2 is a plan view of the uppermost of the pair of grilles associated with the grille shown in FIG. 1:

FIG. 3 is a view in cross section taken on the line 3—3 of FIG. 1:

FIG. 4 is a view in cross section taken on the line 4—4 of FIG. 2:

FIG. 5 is a view in front elevation showing the grilles depicted in FIGS. 1 and 2 as initially disposed in their superimposed relation with the elements thereof in vertically and laterally spaced relation to each other:

FIG. 6 is a view similar to FIG. 5 showing the superimposed grilles disposed with the elements thereon in a vertical overlapping relation:

FIG. 7 is a view in cross section of the assembled superimposed grilles with the elements thereof vertically overlapping and as laterally contracted relative to each other:

FIG. 8 is a plan view of a fragmentary side portion of one of the grilles with the elements thereof laterally expanded showing the means for uniformly spacing the elements:

FIG. 9 is a view similar to FIG. 8 showing the elements in their laterally contracted position:

FIG. 10 is a view in longitudinal section and elevation taken on the line 10—10 of FIG. 8:

FIG. 11 is a view in transverse section and elevation taken on the line 11—11 of FIG. 8:

FIG. 12 is an isometric view of one of the elements of the lower grille showing it detached:

FIG. 13 is an isometric view of one of the elements of the upper grille showing it detached:

FIG. 14 is a plan view with portions broken away of the grille assembly showing the manner of holding the elements thereof in their laterally contracted position:

FIG. 15 is an end view of the structure shown in FIG. 14:

FIG. 16 is an isometric view of a clamping element as indicated by the arrow 16 in FIG. 15:

FIG. 17 is an isometric view of a channeled panel sometimes employed in conjunction with the grilles shown in FIGS. 1 and 2:

FIG. 18 is a diagram in section, partly in elevation, depicting the manner of initially positioning a felted sheet on the indenting elements of the lower grille depicted in FIG. 3:

FIG. 19 is a view similar to FIG. 18 showing the manner of superimposing the upper grille on the felted sheet:

FIG. 20 is a view similar to FIG. 19 showing the manner in which the upper grille and the indenting elements thereon are depressed relative to the lower grille to initially impress the indenting elements of both the upper and lower grilles into the opposite sides of the felted sheet:

FIG. 30 is an isometric view of a spirally corrugated tubular length of felted material as produced by the hereinafter recited method:

FIG. 31 is a detail in longitudinal section of the structure shown in FIG. 30:

FIG. 32 is a view in longitudinal section partly in elevation with portions broken away depicting the means and initial step of forming the indented tube shown in FIG. 31:

FIG. 33 is a view in section and elevation taken on the line 33—33 of FIG. 32:

FIG. 34 is a view in side elevation illustrating a step employed in producing the indented tube immediately following the step shown in FIGS. 32 and 33:

FIG. 35 is a view in section and elevation depicting a step immediately succeeding the step shown in FIG. 4: and FIG. 36 is a view similar to FIG. 35 depicting the manner of completing formation of the spiral indentation on the tube in a step immediately following that depicted in FIG. 35.

Figure 21:
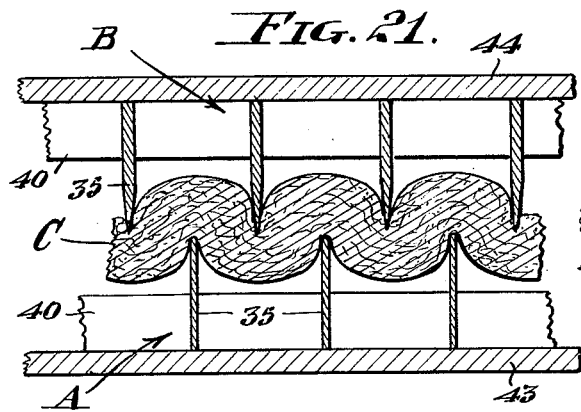
FIG. 21 is a view similar to FIG. 20 showing the manner in which the felted material is compressed longitudinally to effect indentation of the sheet by contracting the indenting elements of the superimposed grilles laterally relative to each other.

Generally considered the method employed in treating a preformed sheet of felted fibrous material, as depicted in the drawings, resides in initially selecting a sheet of the felted material of desired thickness consisting of either a single layer or a series of laminations or plies wherein the fibers of the material extend generally in the direction of the length of the sheet, incorporating in the material a suitable binder, impressing spaced apart parallel lineal indentations in a surface of the sheet transversely and throughout the width thereof with such indentations having a uniform depth throughout the lengths thereof with such depth being substantially less than the thickness of the sheet and while holding such indentations against deformation contracting the sheet longitudinally between the adjacent indentations to compact the material between the indentations, then subjecting the mass to such action as will cure the binder incorporated therein so that on freeing the material the formed indentations will be permanently retained therein and the material between adjacent indentations and extending along the inner margins thereof will be maintained in a compacted state.

Referring to the drawings more specifically, reference now being had to FIGS. 1 to 27 inclusive, A and B indicate respectively the lower and upper of a pair of grilles which are designed to be horizontally disposed in superimposed relation on opposite sides of a horizontal sheet C of the material to be worked; the grilles A—B each embodying a series of spaced parallel individual blades 35 which blades are engageable with the opposite sides of the sheet C at least throughout the width thereof and are adapted to be manipulated such as to initially press spaced apart parallel straight recesses or channels in the sheet material of uniform depth throughout and to thereafter be retracted laterally relative to each other in such manner as to contract the sheet material in the direction of its length and to compact the material of the sheet all without stretching the fibers in the material as will presently be described.

Each of the blades 35 comprises a thin straight elongated rectangular strip of stiff material, such as metal or plastic, substantially inflexible in its width and thickness and having a longitudinally straight thin blunt working edge $a$. The blades 35 are slidably supported at their ends on a pair of parallel guide rods 36—36 constituting side rails of the grilles A—B, the working edges $a$ of the blades 35 on the grille A being presented upwardly and with the working edges of the blades 35 on the grille B being presented downwardly as shown in FIGS. 3 and 4 respectively.

Means are provided for uniformly spacing the blades 35 in a laterally extended relation to each other. This means is here shown as comprising headed pins 37 loosely mounted in holes 38 arranged adjacent the ends of the blades 35; a pin 37 being passed through a hole 38 in a blade 35 with its outer end extending through an aligned hole 38 in an adjacent blade and with its free end projected through the latter and fitted with a cotter-pin 39 or other suitable abutment for holding the pin 37 against withdrawal and also serve in co-operation with the headed end of the pin 37 to limit the extent of spacing apart of the adjacent blades 35. The blades 35 are thus adjustable relative to each other on the rods 36 with outward movement of adjacent blades relative to each other limited by the spacing pins 37. As a means for limiting contractile or inward relative movement of the blades 35 relative to each other, the outer end portions of the blades have spacing blocks 40 fixed thereon. The blocks 40 project laterally from corresponding side faces of the blades 35 at the ends of the latter and have holes $b$ through which the rods 36 slidably extend. The outer side margins $c$ of the blocks 40 extend parallel to an adjacent blade 35 in spaced relation thereto when the adjacent blades 35 are in their extended relation to each other and which side margins $c$ serve as abutments for the adjacent blades to limit their retractive movement toward each other.

Each of the grilles A—B has an end plate 41 at one of corresponding ends thereof paralleling the adjacent end blade 35 which end plates have open ended slots $d$ through which the adjacent ends of the rods 36 extend on which latter is screwed nuts 42 bearing against the outer faces of the plates to hold the rods against accidental withdrawal from the slots $d$. The end blades 35 are attached to the end plates 41 by a pair of the headed pins 37 to limit the outward movement of end blades 35 and plates 41 relative to each other.

When it is desired to dispose the blades 35 of the grilles A—B in their advanced or extended relation to each other, such is accomplished by pulling the blade assembly from the opposite ends thereof until movement of the adjacent blades is arrested by the stops afforded by the headed pins 37, and when it is desired to contract the blade assemblies the ends thereof are shoved toward each other until retractive movement of adjacent blades is arrested by the spacing blocks 40. The recited advancement and retraction of the blade assemblies is readily effected manually, the blades being freely slidable on the guide rods 36 which latter serve to maintain the blades 35 thereon in parallel relation to each other.

Expansive adjustment of the grilles A—B is facilitated by initially supporting them on a table top or bench and securing the end plates 41 thereto, which may be done in any suitable manner, and then pulling the free end of the grille to effect the desired adjustment.

When the grilles are expanded as above described, the blades 35 will remain at rest in their adjusted position while the grilles are horizontally disposed and until they are subsequently subjected to pressure such as to advance adjacent blades toward each other.

When it is desired to produce indented channels in the sheet C, the lower grille A is extended horizontally on a supporting panel 43 with the working edges $a$ of the blades 35 presented upwardly and with the blades disposed in their extended positions relative to each other whereupon the sheet C to be channeled, previously impregnated with a bonding agent such as thermo-plastic substance or the like, is laid on the grille A with its under side seated on the working edges $a$ of the blades 35 as particularly shown in FIG. 18. The grille B is then imposed on the sheet C with its blades 35 in their extended positions relative to each other and with the working edges $a$ of the blades 35 thereof resting on the upper surface of the sheet C at points mediate the points of engagement of the blades 35 of the grille A, as shown in FIG. 19. Proper positioning of the grilles A—B relative to each other is facilitated by disposing the end plates 41 thereof in vertical and longitudinal alignment.

After thus positioning the grilles A—B on opposite sides of the sheet C the upper grille B is depressed toward the lower grille A as shown in FIGS. 6 and 20. This operation causes the blades 35 on the upper grille B to compress the fiberous sheet C and to indent or crease the latter along the edges $a$ of the blades 35 as shown in FIG. 20 to a depth substantially less than the thickness of the sheet and thereby compressing the material of the sheet along the bottoms of the indentations. Depression of the grille B is facilitated by imposing thereon a plate 44 as indicated in FIG. 20 whereby the blades 35 of the grille B may be depressed collectively.

Figure 22:
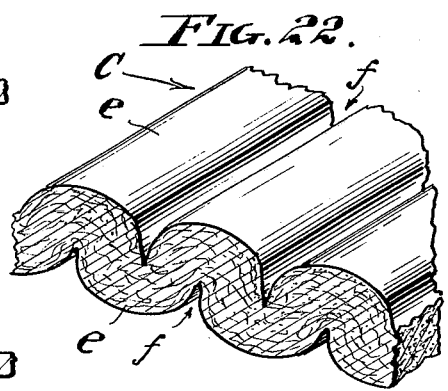
FIG. 22 is an isometric view of a fragmentary portion of the finished covering formed in the manner illustrated in FIGS. 16 to 21 inclusive.

On completing the above recited operation the assemblies of blades 35 on the grilles A and B are contracted laterally as indicated in FIGS. 7 and 21 thereby gathering the material of the sheet C longitudinally thereof and compacting it laterally between adjacent blades, thereby crimping the sheet C and forming folds extending longitudinally of the width of the sheet as particularly shown in FIGS. 21 and 22. The folds thus formed comprise alternate ribs $e$ and channels $f$ on opposite sides of the sheet C with the ribs and channels on one side of the sheet offset relative to the ribs and channels on the opposite side of the sheet. As thus formed the outer faces of the ribs $e$ are curved or arcuate as shown in FIG. 22.

On completion of this gathering and crimping operation the grilles A—B in their contracted state are fastened together so as to retain the sheet C in its compacted folded condition. The fastening means is here shown in FIGS. 7–14 and 15 as embodying a pair of clamps D each of which includes a clamping rod 45 having a grille engaging jaw 46 on each end thereof. The clamps D are arranged with the rods 45 thereof extending along the sides of the assembled grilles and with the jaws 46 overlying the end portions of the ends of the grilles as shown in FIGS. 14 and 15. One end of each rod 45 is formed with a head $g$ and has its other end threaded, the rod loosely passing through one of the jaws 46 and arranged with its head engaging the latter while the threaded end of the rod is screwed into engagement with a boss $h$ on the companion jaw 46 as shown in FIG. 16. By this arrangement the pair of jaws 46 may be clamped into gripping engagement with the ends of the grilles A—B and thereby hold them in their contracted condition.

The resultant assemblage is then treated in a suitable conventional manner such as to cure the binder with which the sheet is impregnated, whereupon the clamps D are removed from the grilles A—B thus releasing the latter whereupon the grilles are separated from the sheet C then constituting the finished product, shown in FIG. 22, which may be readily flexed along the indented channels $f$ formed therein.

The product is characterized by having a mean wall thickness exceeding that of the unworked sheet with the folds or ribs $e$ between the adjacent indented channels $f$ of approximate rectangular cross section thus amplifying the insulating property of a sheet of given area.

The binder employed may consist of any of various substances commonly used for adhering fibrous materials in mass, including binders which are cured or set by subjecting the materials impregnated therewith to the action of applied heat, as in an oven, as well as binders which are cured by air circulation or merely by exposure to atmosphere. Among the various binders suitable for the herein recited purposes are elastomers (such as rubber in solvent or latex vehicles), powdered or liquid resins of the thermo-plastic or thermo-setting variety, or adhesives such as glue.

A typical thermo-setting plastic resin generally used as a binder for glass fibers is a phenol-formaldehyde dispersion or solution in water, applied by spraying into a mass of fibrous material as it is formed. The resultant felt is maintained in the uncured state until used. The composition is generally about 30% resin and 70% fiber before curing which is effected at a temperature of 350° F., or thereabouts, for a suitable period, during which time about 5% of the resin is lost by vaporization.

In molding the channels $f$ as above described, they are preferably shaped with their opposed side walls close together with their inner margins located on a plane at least substantially mediate the opposed faces of the finished sheet.

Figure 23:
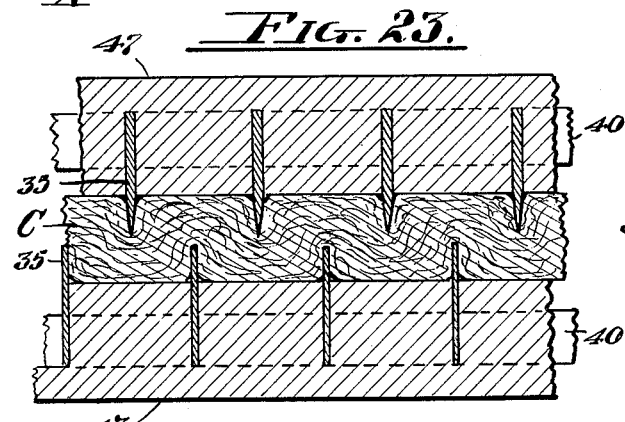
FIG. 23 is a view similar to FIG. 21 showing the manner of utilizing the panel depicted in FIG. 17 in imparting a rectangular formation to the indentations produced in the felted sheet.

In the arrangement shown in FIGS. 21 and 23 blades 35 of the grille B are thicker than the blades of the grille A, the latter blades being relatively thin, whereby the channels $f$ formed in the sheet C by the grille B are wider than those formed by the grille A, and in order to facilitate indentation of the sheet by the blades of the grille B and also form the channels produced by such blades of sharp angled cross-section the blades have elongated tapers leading to their working edges $a$ which edges are relatively sharp angled. It is to be noted that the face of the sheet contoured by the grille B constitutes the inner side of the sheet which is presented to the surface to which the sheet is applied.

By the arrangement just described the relatively wide tapered channels $f$ formed by the grille B on the inner side of the sheet, slab or panel constituting the finished covering, will tend to close on bending the inner face of the slab or panel on an arc, while the narrow outer channels $f$ formed by the grille A will spread only minutely on such bending of the covering. Any gaps as may develop on the outer face of the applied covering may be closed by applying force such as to compress the material transversely of the gaps, as by winding tape or the like around the covering when applied to cylindrical bodies. On applying the covering the thickness of the portions thereof opposite the inner margins of the channels $f$ will be substantially that of the original sheet C before crimping thereof, thus maintaining and possibly increasing the insulating properties of the sheet before working thereof.

Figure 24:
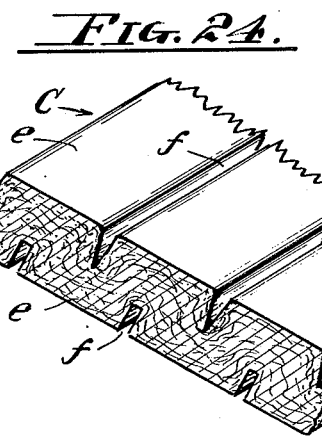
FIG. 24 is an isometric view of a fragmentary portion of the corrugated felted sheet produced by the arrangement shown in FIG. 23.

When it is desired to form the product with flat faced folds as illustrated in FIG. 24 the above recited assemblage is supplemented by the employment of a pair of complementary rigid molding panels 47 one of which is shown in FIG. 17. Each of the panels 47 comprises a series of coplanar ribs $i$ of rectangular cross-section whereby the ribs have flat outer faces $j$ and are separated by grooves $k$ having parallel side walls. The panels thus formed are dimensioned to conform in outline to the sheet C with the ribs $i$ having a width corresponding to the distances between adjacent blades 35 when in their contracted positions, and with the slots $k$ having a width corresponding to the thickness of the blades 35.

In employing the molding panels 47 they are positioned on outer sides of the grilles A—B with the outer edge portions of the blades 35 of the grille A extending into the grooves $k$ on one of the panels 47 and with the outer edge portions of the blades 35 of the grille B extending into the grooves $k$ of the other panel 47.

The flat faces $j$ of the rigs $i$ of the pair of panels 47 will then be presented toward each other and will form abutments for the opposite sides of the then crimped or folded sheet C interposed therebetween as shown in FIG. 23. The panels 47 are held under pressure against the sheet C in any suitable manner thereby compressing the material of the sheet and holding it compressed during curing of the binder incorporated therein and thereby molding the initially curved folds thereof into a flat-faced substantially rectangular form as shown in FIG. 24.

Figure 25:
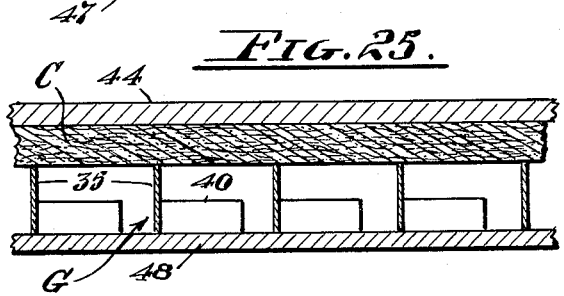
FIG. 25 is a diagram in section illustrating the manner of initially interposing the felted sheet on the indenting elements of the lower grille and utilizing the latter in forming the indentations on one side only of the sheet.
Figure 26:
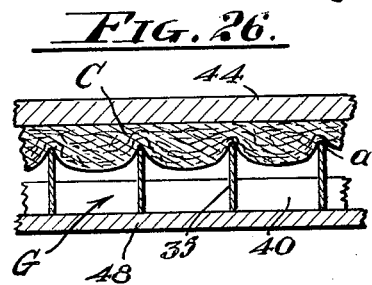
FIG. 26 is a view similar to FIG. 25 showing the manner of operating the grille in effecting indentation of the sheet.
Figure 27:
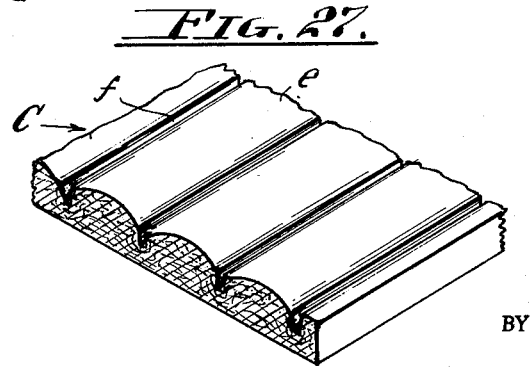
FIG. 27 is an isometric view of a fragmentary portion of the indented sheet as formed in the manner depicted in FIGS. 25 and 26.

While the invention has above been described as applied to formation of the sheet C with channels $f$ on both sides thereof, it is also applicable to formation of the sheet with the channels $f$ on one side only of the sheet C as shown in FIG. 27. To accomplish this result a single grille G corresponding to either of the grilles A—B is employed as shown in FIGS. 25 and 26. In this instance the grille G embodying the assemblage of blades 35 and spacers 37–40 is seated on a platform 48 with the working edges $a$ of the blades 35 presented upwardly and with adjacent blades in their spread apart or expanded relation to each other whereupon the impregnated felted sheet C to be crimped is imposed on the blade assembly as shown in FIG. 25.

A panel 44 is then imposed on the sheet C and subjected to pressure such as to cause the upstanding blades 35 to indent channels $f$ on the underside of the sheet, whereupon the grille G is contracted longitudinally thereby crimping the felted material of the sheet between adjacent blades 35 as illustrated in FIG. 26. While maintaining the sheet in its crimped state it is subjected to a suitable curing action as before described whereupon the sheet is removed from the grille and is then in readiness for use.

Figure 28:
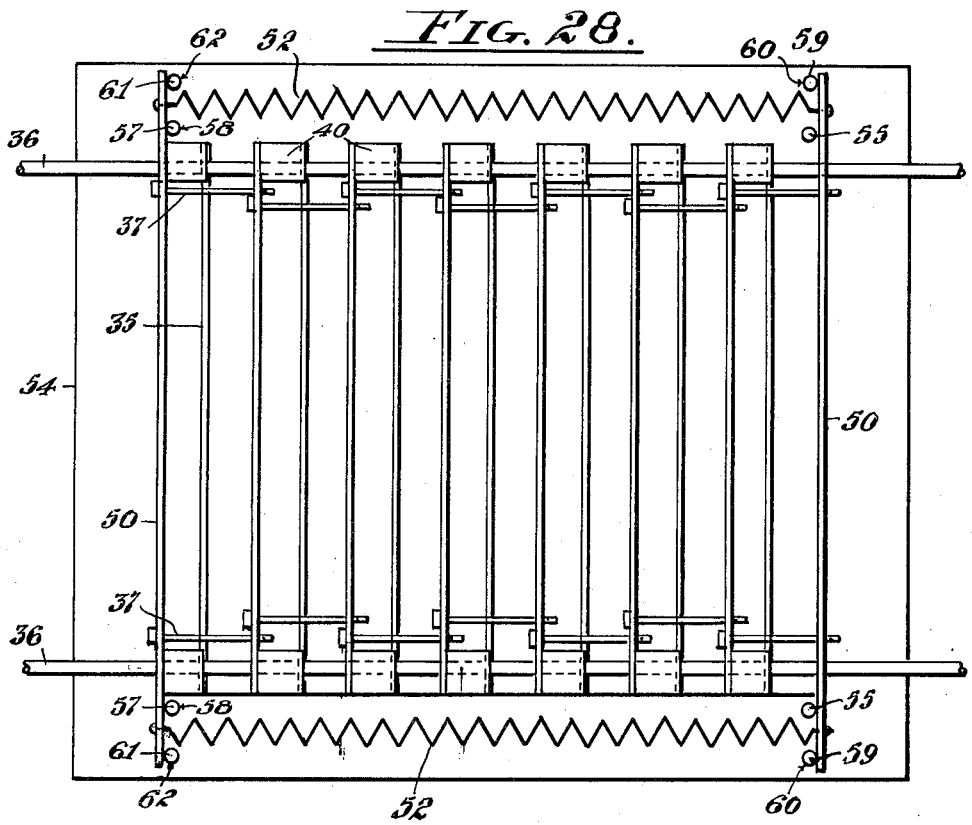
FIG. 28 is a plan view of a modified form of the corrugating mechanism shown in FIGS. 1 to 7 inclusive.
Figure 29:
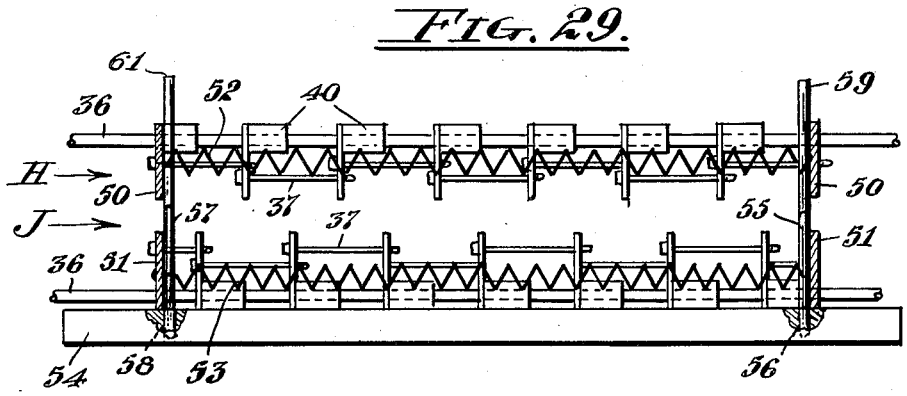
FIG. 29 is a view in elevation of the structure shown in FIG. 28 with portions broken away.

In the mechanism shown in FIGS. 28 and 29 a pair of grilles H and J embodying the construction and arrangement of elements employed in the grilles A—B above described are supplemented by spring means normally maintaining the grilles in their contracted conditions and operable to automatically contract the grilles from their expanded positions to crimp and compress the felted sheet longitudinally. As here shown the grilles H—J each have end plates 50—50 and 51—51 respectively extending in parallel relation to the blades 35 and projecting at their end beyond the ends of the blades. Interposed between the projecting ends of the plates 50—50 and 51—51 are pairs of contractile coil springs 52—52 and 53—53 which springs exert a pull on the end plates normally maintaining the plate assembly interposed between said plates in a contracted relation.

In employing the grilles H and J in crimping a felted sheet the grill J is seated horizontally on a panel 54, such as a table top or bench, with one of the end plates 51 thereof anchored to the panel 54 as by a pair of pins 55 extending in front of the panel 51 and demountably engaged in holes or sockets 56 in the panel 54. A pull is then exerted on the other panel 51 of the grille J to elongate the grille to its extended position thereby stretching the springs 53 whereupon pins 57 are inserted in holes 58 in the panel 54 adjacent the panel 51 to thereby form abutments which engage the panel 51 and thereby hold the grille J in its extended position. The sheet C to be indented is then imposed on the upstanding blades 35 of the grille J whereupon the grille H is imposed on the sheet with one of its end panels 50 aligned with the adjacent end panel 51 of the grille J and abutting a pair of pins 59 removably engaged with sockets 60 in the panel 54.

A pull is then imposed on the other end panel 50 to expand the grille H and stretch the springs 52—52 whereupon said last named end panel 50 is engaged by pins 61 removably engaged with holes 62 in the panel 54.

The grille H is then depressed relative to the grille J by imposing a weight on the grille H so as to cause the blades 35 of the grille to indent the impregnated felted sheet as before described. The end panels 50—50 and 51—51 of the grilles are then disengaged from the pins 55, 57, 59 and 61 either by lifting the assembly clear of the pins or by removing the pins from the panel 54. On freeing the end panels, the spring 52—52 and 53—53 will act to contract the grilles longitudinally thereby automatically compressing the felted sheet longitudinally to complete formation of the crimps or folds as before described. By the foregoing described construction the springs 52—52 and 53—53 will serve to hold the grilles H—J in their contracted condition during curing of the felted sheet.

In the above recited application of the invention the resultant product is a substantially flat crimped sheet which in its use may be laid over flat or curved surfaces and bent around inside or outside corners for which purpose the folds of the sheet comprise parallel ridges and channels. The invention however contemplates the production of cylindrical tubular spirally indented tubes T of the felted material as shown in FIGS. 30 and 31. To accomplish this purpose the procedure and implements illustrated in FIGS. 32 to 36 inclusive are employed, which implements include a cylindrical mandrel 65 around which is wound in snug engagement therewith a spiral spring 66 elongated under tension and having its ends detachably engaged with holes 67 in the mandrel whereby the spring 66 is held in its extended position.

A thin sheet of felted material K is wound snugly around the spring 66 in layers to provide a cylindrical body thereof of desired thickness. On this being done a flexible cord or wire 68 is wound around the resultant felted cylinder between the convolutions of the spring 66, the cord being brought taut to depress the material engaged thereby tightly against the mandrel 65 intermediate the convolutions of the spring 66 as shown in FIG. 34. On this being accomplished the resultant assemblage is inserted in a cylindrical shell 69 which encompasses the cylindrical material K in close relation thereto as particularly shown in FIG. 35. One end of the spring 66 is then disengaged from the mandrel 65 so that the spring will then contract under tension thereof thereby compressing the material K between the convolutions of the spring. This action expands the material K against the inner surface of the shell 69 while contracting the material transversely between the convolutions of the spring 66 and cord 68 as shown in FIG. 36. The assembly is then subjected to a curing action whereby a binder with which the material K is impregnated will be cured or set so that the crimped tube will retain its shape when removed from the shell 69 until subjected to strains. The covering tube thus formed is removed from the shell, after which it is split longitudinally to provide a kerf 70 along which the tube may be spread to permit its positioning around a pipe or the like to be covered thereby. When applied the covering may be wrapped with a protective layer in a usual manner. The resultant tubular product is subject to being readily flexed.

An important feature of the invention resides in fact that by crimping or gathering the sheet material in the manner herein set forth stretching of the material does not occur so that the sum of the surface areas of the side walls of the channels $f$ and ridges $e$ of the treated sheet corresponds to the surface area of the sheet before working thereof, or substantially so; the action of the elements in indenting the channels $f$ being such that while compressing the materials in the direction of thickness of the sheet, no elongation of materials is effected but merely displacement of the fibers of the material occurs without rupture thereof.

While the invention is applicable to the working of sheets of various felted fiberous materials it is especially designed for treatment of sheets of felted fiber glass of the type which when fabricated in bonded sheets of substantial thickness, either unitarily or laminated, is non-pliable or inflexible, like plywood, although subject to bending slightly when a long length thereof is supported only at one or both of its ends. Such material, however, is readily compressible and resilient in the direction of its thickness due to its voids which properly facilitates crimping of the sheet as herein set forth, and enables conversion of a stiff board-like sheet into a flexible sheet capable of being readily bent to conform to curved surfaces.

While I have shown and described several embodiments of the invention I do not limit myself to the exact steps and details of construction set forth in the drawings and specification, and accordingly the invention embraces any and all changes as may be made, coming within the spirit and scope of the appended claims.

I claim:

1. In a mechanism for producing a flexible insulating covering from a preformed matted sheet of fibers, means engageable with one side of the sheet to indent spaced parallel channels therein leading across the width thereof, and means engageable with the other side of the sheet to form parallel channels in the thickness thereof, the means for forming the channels on one side of the sheet being offset relative to the means for forming the channels on the other side of the sheet, said channel forming means being movable collectively while engaged with said sheet to compress the material between the opposed surfaces of said sheet in a direction extending transversely of the channels formed therein.

2. The structure called for in claim 1 in which each of said channel forming means includes a plurality of transversely movable sheet penetrating elements, and a support therefor relative to which the elements are movable.

3. In a mechanism for producing flexible insulating coverings from preformed sheets of matted fibers, a grille having a series of spaced parallel elongated blades for indenting parallel spaced channels within a surface of such sheets, a pair of parallel rods on which said blades are independently slidably supported adjacent their ends for transverse movement relative to each other, and means on said blades for limiting movement of said blades toward and away from each other.

4. The structure called for in claim 3 together with spring means connected to the ends of said series of blades for contracting the blades relative to each other.

5. In a mechanism for producing flexible coverings from preformed sheets of matted fibers, embodying an assembly of a series of spaced parallel horizontally extending blades having straight indenting lower edges, vertically movable means for supporting said blades for lateral slidable movement relative to each other, and means connecting adjacent of said blades limiting their relative lateral movement in either direction; means connected to certain of said blades for collectively urging said blades toward each other to contract the assembly thereof, means engageable with the end blades for releasably holding the blade assembly in an expanded position, and means engageable with the end blades for detachably holding the assembly of blades in a contracted position.

References Cited in the file of this patent

UNITED STATES PATENTS

| | | |
|---|---|---|
| 775,541 | McConnell | Nov. 22, 1904 |
| 2,158,087 | Rowe | May 16, 1939 |
| 2,177,490 | Kieffer | Oct. 24, 1939 |
| 2,199,918 | Jarosik | May 7, 1940 |
| 2,229,916 | Christman | Jan. 28, 1941 |
| 2,347,101 | Harding | Apr. 18, 1944 |
| 2,425,207 | Rowe | Aug. 5, 1947 |
| 2,447,784 | Wood | Aug. 24, 1948 |
| 2,481,049 | Stamm | Sept. 6, 1949 |
| 2,655,196 | Magnani | Oct. 13, 1953 |
| 2,684,314 | Ross | July 20, 1954 |